Patented Jan. 3, 1928.

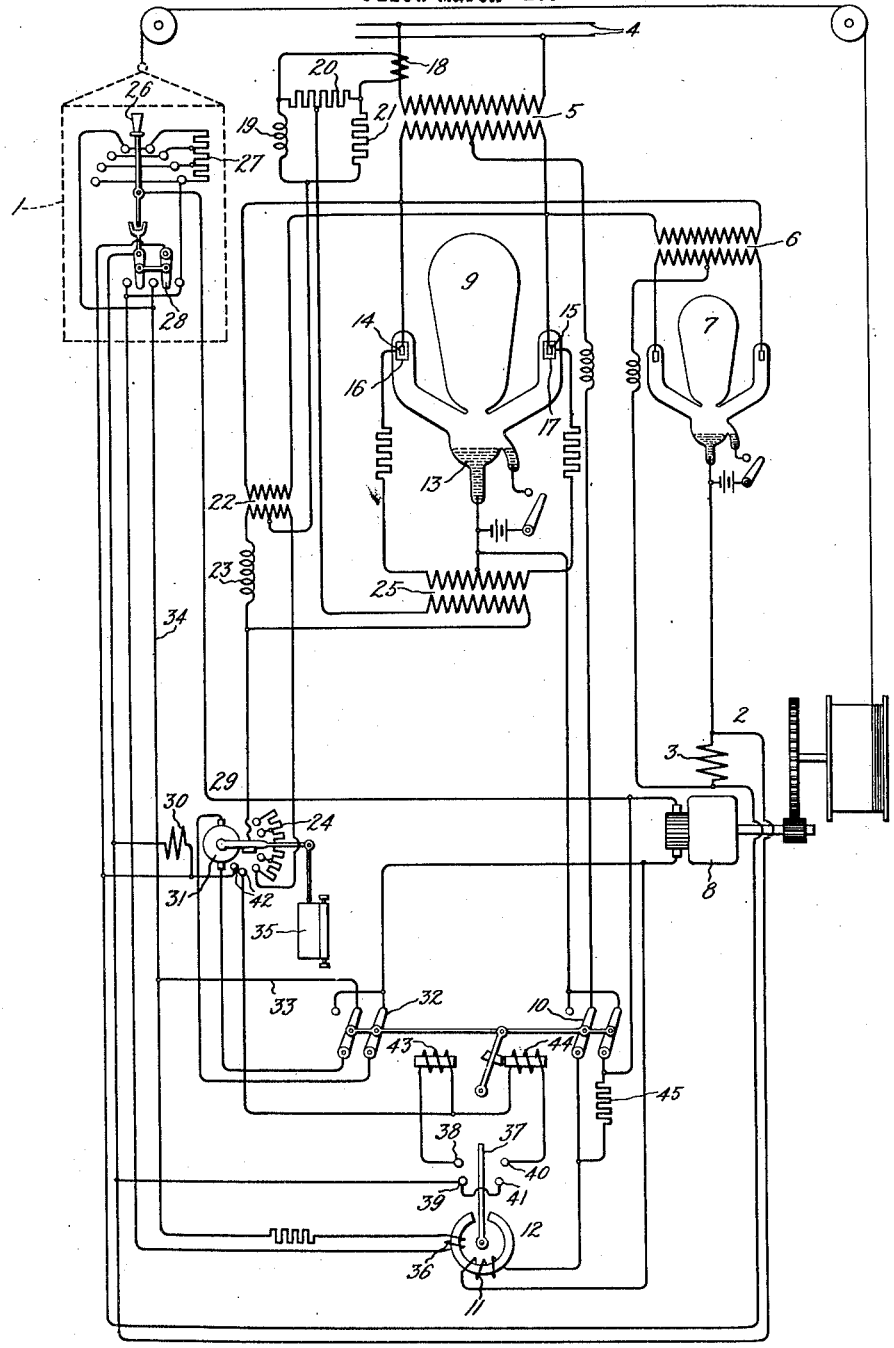

1,654,989

UNITED STATES PATENT OFFICE.

ALBERT H. MITTAG, OF SCHENECTADY, NEW YORK, ASSIGNOR TO GENERAL ELECTRIC COMPANY, A CORPORATION OF NEW YORK.

POWER-CONTROL APPARATUS.

Application filed March 10, 1927. Serial No. 174,403.

My invention relates to power control apparatus, and has for its principal object the provision of an improved apparatus and method of operation whereby the power transmitted through a space discharge device connected between direct and alternating current circuits may be readily controlled.

Where power is interchanged between direct and alternating current circuits, it is frequently desirable that the electrical conditions of one of these circuits be varied independently of the conditions under which the other circuit is operated. Thus in the case of a direct current machine connected to an alternating current circuit through a space discharge device, such as a mercury rectifier provided with a grid arranged to control the current transmitted between its cathode and anode, it is desirable that the voltage of the machine be varied independently of the voltage of the alternating current circuit for the purpose of controlling the machine speed both while motoring and regenerating.

It is known that the current transmitted through a mercury rectifier may be controlled by adjusting the phase relation between its grid and anode voltages. Thus no current is transmitted through the rectifier when its grid and anode potentials are 180 degrees out of phase with one another; current is transmitted through the rectifier during the entire half cycle of anode voltage when the grid and anode potentials are in phase; and between these two limits, current starts through the rectifier at an instant of time which gradually approaches the beginning of the positive half cycle of anode potential as the grid and anode potentials are brought more nearly in phase with one another.

In accordance with my invention, adjustment in the phase relation between the grid and anode potentials of a space discharge device is effected either manually or in accordance with variation in the load of the machine.

My invention will be better understood from the following description when considered in connection with the accompanying drawing and its scope will be pointed out in the appended claims.

The drawing shows my invention applied to an elevator control system wherein a car 1 is mechanically coupled to a direct current machine 2 which is provided with a field winding 3 connected to an alternating current circuit 4 through transformers 5 and 6 and a rectifier 7 and with an armature winding 8 connected to the source 4 through the transformer 5, a rectifier 9, a reversing switch 10 and an operating coil 11 of a polarized relay 12. The device 9 comprises a cathode 13, anodes 14 and 15, and grids 16 and 17.

Means shown as comprising a current transformer 18, a reactor 19 and resistors 20 and 21 are arranged to apply between the cathode 13 and the grids 16 and 17 a component voltage which has its magnitude determined by the magnitude of the current transmitted between the direct current machine 2 and the alternating current circuit 4 through the transformer 5. Means shown as comprising a transformer 22, a reactor 23 and an adjustable resistor 24 are provided for applying between the cathode 13 and the grids 16 and 17 a component voltage having its phase determined by adjustment of the resistor 24. It should be noted that the resultant of these component voltages is applied to the grids 16 and 17 through a transformer 25 which is connected to the cathode 13 at a point intermediate its ends. With these connections, change in the phase relation between the potential of the anodes 14 and 15 and the potential of the grids 16 and 17 is effected either by variation in the current supplied through the transformer 5 or by adjustment of the resistor 24.

Adjustment of the resistor 24 may be produced either by variation in the voltage of the machine 2 or by adjustment of a control lever 26 located at the car 1. These results are produced through means comprising a potentiometer 27 connected to the rectifier 7 through a reversing switch 28 and a pilot motor 29 provided with a field winding 30 connected to the rectifier 7 and with an armature winding 31 connected to the armature winding 8 through a reversing switch 32, conductors 33 and 34, and a part of the potentiometer determined by the position of the lever 26. With these connections a resultant voltage difference dependent on the position of the lever 26 and the armature voltage of the machine 2 is applied to the armature of the pilot motor which operates to adjust the resistor 24 in one direction or the other depending on whether the armature voltage of the machine 2 is greater or less than the drop across the part of the potentiometer 27 included in the armature circuit.

If the component voltages applied to the armature circuit of the pilot motor 29 through the potentiometer 27 and by the machine 2 are equal, the resultant armature voltage of the pilot motor is zero and this motor is stationary. When the armature voltage of the machine 2 is greater than that applied to the motor armature winding 31 through the potentiometer 27, however, a resultant voltage of one polarity is applied to the winding 31 and the phase relation between the grid and anode voltages of the rectifier 9 is changed in a manner to retard the grid potential of the rectifier 9 with respect to that of its anodes, thus reducing the direct current voltage applied to the machine through the rectifier 9. Likewise when the armature voltage of the machine 2 is smaller than that applied to the motor armature winding 31 through the potentiometer 27, a resultant voltage of opposite polarity is applied to the winding 31 and the phase of the grid potential of the rectifier 9 is advanced with respect to that of its anode potential, thus increasing the armature voltage of the machine 2 until it is substantially equal to that applied to the pilot motor armature through the potentiometer 27. The voltage applied to the pilot motor through the potentiometer 27 is of course dependent on the lever 26 and may be adjusted by this lever to vary the speed of the machine 2. In order to prevent too rapid variation in this speed, a damping element 35 is arranged to cooperate with the operating arm of the pilot motor.

The direction in which the machine 2 is operated depends on whether the lever 26 is moved to the left or to the right for the reason that movement of the lever to one position or the other operates the reversing switch 28 and determines the polarity of the component voltage applied to the pilot motor armature through the potentiometer 27. The positions of the lever 26 and the reversing switch 28 also determine the polarity of the potential applied to an operating coil 36 of the polarized relay 12 by the rectifier 7.

This relay is provided with a contact member 37 and contacts 38 to 41 which cooperate with a pair of contacts 42 at the pilot motor 29 to control the energization of coils 43 and 44 whereby the reversing switches 10 and 32 are operated to one or the other of their closed positions. A resistor 45 is provided to ensure the completion of a circuit between the armature of the machine 2 and the coil 11 of the relay 12 at the instant when the machine 2 changes from motoring to generating or vice versa.

Thus assuming that the operation of the machine 2 changes from motoring to regeneration, the pilot motor operating arm is moved into engagement with the contacts 42 where the grid and anode potentials of the rectifier 9 are opposed; the contact member 37 of the polarized relay 12 is moved into engagement with the contacts 39 and 38, due to the reversed current supplied to the coil 11 through the resistor 45; the reversing switches 10 and 32 are operated to their left hand closed positions; power flows from the machine 2 to the alternating current circuit 4; and the voltage of the machine 2 is regulated as previously described.

Should the driving torque of the load decrease to a point where the machine 2 is required to operate as a motor, the current of the polarized relay coil 11 decreases to a value at which the member 37 is operated into engagement with the contacts 40 and 41 by the coil 36. At about the same time the operating lever of the pilot motor 31 is moved into engagement with the contacts 42, and the reversing switches are operated back into their right hand closed positions so that power is supplied from the alternating current circuit 4 to the machine 2.

Due to the fact that the operating lever of the pilot motor 29 is so arranged as to engage the contacts 42 only when the grid and anode potentials of the rectifier 9 are 180 degrees out of phase with one another, the reversing switches 10 and 32 are operated only when the armature current of the machine 2 is substantially zero regardless of whether their operation is produced by movement of the lever 26, the machine 2 changing from motoring to generating, or by this machine changing from generating to motoring. It will of course be understood that simultaneous reversal in the polarities of the component potentials applied to the armature of the pilot motor ensures proper control of the machine 2 by the lever 26 under all conditions of operation.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:—

1. The combination of alternating and direct current circuits, a space discharge device provided with a cathode and an anode connected between said circuits and with a grid arranged to control the current transmitted between said cathode and anode, means arranged to apply between said cathode and grid a component voltage dependent on said current, and means arranged to adjust the phase relation between the potentials of said grid and anode independently of said current.

2. The combination of alternating and direct current circuits, a space discharge device provided with a cathode and an anode connected between said circuits and with a grid arranged to control the current transmitted between said cathode and anode, and means arranged to regulate the phase relation between the potentials of said grid and anode in accordance with the voltage of said direct current circuit.

3. The combination of alternating and direct current circuits, a space discharge device provided with a cathode and an anode connected between said circuits and with a grid arranged to control the current transmitted between said cathode and anode, means arranged to regulate the phase relation between the potentials of said grid and anode in accordance with an electrical condition of one of said circuits, and means arranged to reverse the connections between said circuits only when the potentials of said grid and anode are substantially 180 degrees out of phase with one another.

4. The combination of alternating and direct current circuits, a space discharge device provided with a cathode and an anode connected between said circuits and with a grid arranged to control the current transmitted between said cathode and anode, means arranged to apply to said grid and anode potentials which differ in phase by a phase angle dependent on an electrical condition of one of said circuits, and means arranged to reverse the connections between said circuits only when said phase angle assumes a predetermined value.

5. The combination of alternating and direct current circuits, a space discharge device provided with a cathode and an anode connected between said circuits and with a grid arranged to control the current transmitted between said cathode and anode, means arranged to apply to said grid and anode potentials which differ in phase by a phase angle dependent on the load of said direct current circuit, and means comprising a polarized relay connected to said direct current circuit for causing the connections between said circuits to be reversed only when said phase angle assumes a predetermined value.

6. The combination of alternating and direct current circuits, a space discharge device provided with a cathode and an anode connected between said circuits and with a grid arranged to control the current transmitted between said cathode and anode, means arranged to apply to said grid and anode potentials which differ in phase by a phase angle dependent on the electrical conditions of said direct current circuit, means comprising a polarized relay connected to said direct current circuit for causing the connections between said circuits to be reversed only when said phase angle assumes a predetermined value, and manual means arranged to control said phase angle independently of said load.

7. The combination of alternating and direct current circuits, a space discharge device provided with a cathode and an anode connected between said circuits and with a grid arranged to control the current transmitted between said cathode and anode, means arranged to apply to said grid and anode potentials which differ in phase by a phase angle dependent on the voltage of said direct current circuit, means comprising a polarized relay connected to said direct current circuit for causing the connections between said circuits to be reversed only when said phase angle assumes a predetermined value, and manual means arranged to control both said phase angle and the operation of said relay independently of said load.

8. The combination of alternating and direct current circuits, a space discharge device provided with a cathode and an anode connected between said circuits and with a grid arranged to control the current transmitted between said cathode and anode, a source of substantially constant potential, and means arranged to regulate the phase relation between said grid and said anode in accordance with the difference between the potential of said source and the potential of one of said circuits.

9. The combination of alternating and direct current circuits, a space discharge device provided with a cathode and an anode connected between said circuits and with a grid arranged to control the current transmitted between said cathode and anode, a substantially constant potential source, means arranged to regulate the phase relation between the potentials of said grid and said anode in accordance with the difference between the potential of said source and the potential of said direct current circuit, and means arranged to adjust the part of the potential of said source which is opposed to the potential of said direct current circuit.

10. The combination of alternating and direct current circuits, a space discharge device provided with a cathode and an anode connected between said circuits and with a grid arranged to control the current transmitted between said cathode and anode, a substantially constant potential source, means arranged to regulate the phase relation between the potentials of said grid and said anode in accordance with the difference between the potential of said source and the potential of said direct current circuit, and means arranged to reverse simultaneously the connections of said source and the connections of said direct current circuit.

In witness whereof, I have hereunto set my hand this 9th day of March, 1927.

ALBERT H. MITTAG.